(12) United States Patent
Bogart et al.

(10) Patent No.: US 7,200,393 B2
(45) Date of Patent: Apr. 3, 2007

(54) SYSTEM FOR SPLIT TRANSMISSION FOR ENHANCED SPECTRUM UTILIZATION

(75) Inventors: David Bogart, Heathron, FL (US); Martin Chang, Longwood, FL (US); Richard Bruno, Plantation, FL (US); Christopher Scott Erwin, Wesley Chapel, FL (US); Kraig Keys, Tampa, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 479 days.

(21) Appl. No.: 10/243,185

(22) Filed: Sep. 13, 2002

(65) Prior Publication Data

US 2004/0204107 A1 Oct. 14, 2004

(51) Int. Cl.
*H04Q 7/20* (2006.01)
(52) U.S. Cl. .................. 455/424; 455/423; 455/561; 455/562.1; 455/115.1
(58) Field of Classification Search ........... 455/561, 455/562, 115.1, 67.11, 67.14, 522, 126, 452.1, 455/423–425, 127.1, 63.1, 562.1; 379/1.01, 379/9.04, 27.08
See application file for complete search history.

(56) References Cited

U.S. PATENT DOCUMENTS

| | | | | |
|---|---|---|---|---|
| 5,521,904 A | * | 5/1996 | Eriksson et al. | ............ 370/249 |
| 5,574,981 A | * | 11/1996 | Ahonen | .................... 455/67.14 |
| 5,854,986 A | * | 12/1998 | Dorren et al. | ........... 455/562.1 |
| 6,167,286 A | | 12/2000 | Ward | |
| 6,470,193 B1 | * | 10/2002 | Stolt | ........................ 455/562.1 |
| 6,516,206 B2 | * | 2/2003 | Jantti | .......................... 455/561 |
| 6,640,111 B1 | | 10/2003 | Shapira | |
| 6,711,388 B1 | | 3/2004 | Neitiniemi | |
| 2002/0077154 A1 | * | 6/2002 | Judson et al. | ............... 455/562 |
| 2002/0103001 A1 | | 8/2002 | Weissman | |
| 2002/0119772 A1 | * | 8/2002 | Yoshida | ...................... 455/423 |
| 2002/0137547 A1 | * | 9/2002 | Judson | ....................... 455/562 |
| 2003/0073463 A1 | * | 4/2003 | Shapira | ...................... 455/562 |
| 2003/0139140 A1 | | 7/2003 | Chen | |
| 2003/0236089 A1 | | 12/2003 | Beyme | |
| 2004/0053583 A1 | | 3/2004 | Bogart | |
| 2004/0053608 A1 | | 3/2004 | Bogart | |

* cited by examiner

*Primary Examiner*—Temica M. Beamer
*Assistant Examiner*—Anthony S. Addy
(74) *Attorney, Agent, or Firm*—Parks Knowlton LLC; J. Perry Herndon, Esq.; Coulter C. Henry

(57) ABSTRACT

An apparatus for improving the use of a transmission spectrum in a wireless communications system. The apparatus includes a first radio source for generating a first signal, a first Auto Tune Combiner for processing the first signal, a first antenna associated with a sector for transmitting the first signal, a first radio frequency test device for sampling the processed first signal and producing a first feedback signal, a second radio source for generating a second signal, a second Auto Tune Combiner for processing the second signal, a second antenna associated with the sector for transmitting the second signal, a second radio frequency test device for sampling the processed second signal and producing a second feedback signal, and a multicoupler for directing the first and second feedback signals to the first and second radio sources.

8 Claims, 8 Drawing Sheets

Channel Sets (First Row is the Set Number)

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| 22 | 23 | 24 | 25 | 26 | 27 | 28 | 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 | 97 | 98 | 99 | 100 | 101 | 102 | 103 | 104 | 105 |
| 106 | 107 | 108 | 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 | 145 | 146 | 147 |
| 148 | 149 | 150 | 151 | 152 | 153 | 154 | 155 | 156 | 157 | 158 | 159 | 160 | 161 | 162 | 163 | 164 | 165 | 166 | | |

Channel Sets (First Row is the Set Number)

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| 22 | 23 | 24 | 25 | 26 | 27 | 28 | 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 | 97 | 98 | 99 | 100 | 101 | 102 | 103 | 104 | 105 |
| 106 | 107 | 108 | 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 | 145 | 146 | 147 |
| 148 | 149 | 150 | 151 | 152 | 153 | 154 | 155 | 156 | 157 | 158 | 159 | 160 | 161 | 162 | 163 | 164 | 165 | 166 | | |

Figure 2A

Channel Sets (First Row is the Set Number)

| 1 | 2 | 3 | 4 | 5 | 6 | 7 | 8 | 9 | 10 | 11 |
|---|---|---|---|---|---|---|---|---|---|---|
| 1 | 2 | 3 | 4 | 5 | 6 | 7 | 8 | 9 | 10 | 11 |
| 12 | 13 | 14 | 15 | 16 | 17 | 18 | 19 | 20 | 21 | 22 |
| 23 | 24 | 25 | 26 | 27 | 28 | 29 | 30 | 31 | 32 | 33 |
| 34 | 35 | 36 | 37 | 38 | 39 | 40 | 41 | 42 | 43 | 44 |
| 45 | 46 | 47 | 48 | 49 | 50 | 51 | 52 | 53 | 54 | 55 |
| 56 | 57 | 58 | 59 | 60 | 61 | 62 | 63 | 64 | 65 | 66 |
| 67 | 68 | 69 | 70 | 71 | 72 | 73 | 74 | 75 | 76 | 77 |
| 78 | 79 | 80 | 81 | 82 | 83 | 84 | 85 | 86 | 87 | 88 |
| 89 | 90 | 91 | 92 | 93 | 94 | 95 | 96 | 97 | 98 | 99 |
| 100 | 101 | 102 | 103 | 104 | 105 | 106 | 107 | 108 | 109 | 110 |
| 111 | 112 | 113 | 114 | 115 | 116 | 117 | 118 | 119 | 120 | 121 |
| 122 | 123 | 124 | 125 | 126 | 127 | 128 | 129 | 130 | 131 | 132 |
| 133 | 134 | 135 | 136 | 137 | 138 | 139 | 140 | 141 | 142 | 143 |
| 144 | 145 | 146 | 147 | 148 | 149 | 150 | 151 | 152 | 153 | 154 |
| 155 | 156 | 157 | 158 | 159 | 160 | 161 | 162 | 163 | 164 | 165 |
| 166 | | | | | | | | | | |

Figure 2B

Channel Sets (First Row is the Set Number)

| 1 | 2 | 3 | 4 |
|---|---|---|---|
| 1 | 2 | 3 | 4 |
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |
| 33 | 34 | 35 | 36 |
| 37 | 38 | 39 | 40 |
| 41 | 42 | 43 | 44 |
| 45 | 46 | 47 | 48 |
| 49 | 50 | 51 | 52 |
| 53 | 54 | 55 | 56 |
| 57 | 58 | 59 | 60 |
| 61 | 62 | 63 | 64 |
| 65 | 66 | 67 | 68 |
| 69 | 70 | 71 | 72 |
| 73 | 74 | 75 | 76 |
| 77 | 78 | 79 | 80 |
| 81 | 82 | 83 | 84 |
| 85 | 86 | 87 | 88 |
| 89 | 90 | 91 | 92 |
| 93 | 94 | 95 | 96 |
| 97 | 98 | 99 | 100 |
| 101 | 102 | 103 | 104 |
| 105 | 106 | 107 | 108 |
| 109 | 110 | 111 | 112 |
| 113 | 114 | 115 | 116 |
| 117 | 118 | 119 | 120 |
| 121 | 122 | 123 | 124 |
| 125 | 126 | 127 | 128 |
| 129 | 130 | 131 | 132 |
| 133 | 134 | 135 | 136 |
| 137 | 138 | 139 | 140 |
| 141 | 142 | 143 | 144 |
| 145 | 146 | 147 | 148 |
| 149 | 150 | 151 | 152 |
| 153 | 154 | 155 | 156 |
| 157 | 158 | 159 | 160 |
| 161 | 162 | 163 | 164 |
| 165 | 166 |  |  |

Figure 2C

SYSTEM FOR SPLIT TRANSMISSION FOR ENHANCED SPECTRUM UTILIZATION

BACKGROUND OF THE INVENTION

The present invention relates to a method and apparatus for the transmission of communications signals in a wireless network. More particularly, the present invention relates to a method and apparatus for enhancing spectrum utilization at a wireless communications transmission site.

In a wireless communications system, a wireless carrier is often limited in the amount of radio frequency spectrum it can use in the operation of the site. For example, in an e-band license, a wireless carrier may only be allotted 5 MHz of spectrum to use for transmitting wireless signals. This 5 MHz of spectrum must be divided into channels on which wireless signals are transmitted. In a typical configuration, 30 kHz channels are used, which means that a 5 MHz spectrum must be divided into approximately 166 different channels. In this manner, a wireless carrier, at a particular wireless communications site, is limited to these 166 different channels.

Further limitations on the use of these 166 different channels are imposed by the equipment used in a wireless communications site. Depending on the type of equipment used, not all of the 166 channels may be available for transmission at a particular time. The inability to use most of the 166 channels creates difficulty in the operation of the wireless communications system.

If the full 5 MHz of spectrum cannot be utilized, then additional wireless communications sites may need to be constructed. The construction of a wireless communications site involves considerable time and expense. A typical site, such as a cellular site, involves the construction of a tower and an accompanying building to house the electronic equipment necessary to operate the site. Land must be purchased, zoning regulations must be complied with, funds for construction must be outlaid, and time must be invested in constructing the site. Therefore, it is desirable to avoid constructing additional sites by fully utilizing the available spectrum allotted to a wireless carrier.

FIG. 1 illustrates a conventional configuration of a wireless communications site. This site 100, which is typically a cellular site, generally includes a set of radio frequency sources 105, a set of Auto Tune Combiners 110, a band pass filter 115, a multicoupler unit 120, an antenna 125, a radio frequency test loop device 130, and a multicoupler 135. All of these components except the antenna 125, are typically housed in a small building at the wireless communications site. The antenna 125 is typically mounted to a tower which is also at the site.

In the typical configuration of FIG. 1, the set of radio frequency sources 105 are interconnected to the set of Auto Tune Combiners 110. The set of Auto Tune Combiners 110 is then connected to band pass filter 115 which is then connected to multicoupler unit 120. Multicoupler unit 120 is interconnected to antenna 125 and radio frequency test loop device 130. Radio frequency test loop device 130 is connected to multicoupler 135, which is then connected to radio source 105.

Typically, the set of radio frequency sources 105 comprises multiple radios—in this case, six 30 watt radios. Each of these 30 watt radios is typically housed in a cabinet contained within a small building adjacent to the tower at the wireless communications site. Each of these 30 watt radios generates a signal at a particular frequency or on a particular channel that is later transmitted on antenna 125. In this configuration of six radios, the transmission on antenna 125 is limited to six different frequencies or six different channels. Generally, the number of radios is limited only by the spectrum that is assigned to a wireless carrier as well as the space available in the cabinet and small building at the wireless communications site. In other typical configurations, more than six radios are employed at a given site.

The signal generated by each of the 30 radios then passes to one of the Auto Tune Combiners 110. In the typical configuration, each individual radio has associated with it a single Auto Tune Combiner. In this case, the set of Auto Tune Combiners 110 comprises six separate Auto Tune Combiners that are cabled together. Usually, these six different Auto Tune Combiners are all interconnected to an Auto Tune Combiner Controller (not shown), which controls the operation of the six individual Auto Tune Combiners. An Auto Tune Combiner functions to combine all of the different signals produced by the radios to get maximum power out to the antenna. In this case, the six 30 watt radios produce six signals at six different frequencies. The Auto Tune Combiner takes these six signals at the six different frequencies and combines them so as to form one signal that is transmitted by antenna 125.

After the Auto Tune Combiners 110 process the signals from the six radios 105, the resulting output is passed through band pass filter 115. Band pass filter 115, in a typical configuration, operates to ensure that the transmission on antenna 125 is within a prespecified frequency range. In this case, a wireless provider with 5 MHz of spectrum available would configure band pass filter 115 so that any signal transmitted on antenna 125 would be within the 5 MHz spectrum.

After the signal is filtered by band pass filter 115, it passes to multicoupler unit 120. Multicoupler unit 120 serves typically as a connection point for antenna 125 as well as a sampling point for radio frequency test loop device 130. A coaxial cable typically connects multicoupler 120 to antenna 125. It is across this cable that the signal is sent to antenna 125 for transmission. In addition, multicoupler unit 120 has two test points, a forward signal test point and a reflected signal test point. The forward signal test point of multicoupler unit 120 is connected to the forward port of radio frequency test loop device 130 and the reflected signal test point on multicoupler unit 120 is connected to the reflected port of radio frequency test loop device 130.

Radio frequency test loop device 130 (RFTL) samples the forward and reflected signals from multicoupler unit 120. The forward signal path is the path taken by the signal that is transmitted on antenna 125. The reflected path is the signal or power reflected back from antenna 125. RFTL 130 takes measurements of the forward path signal and the reflected path signal to verify that the six radios are each transmitting at a proper power. The RFTL 130 verifies the power of each frequency and sends signals to the radios to increase or decrease power. Additionally, RFTL 130 verifies that the antenna is operating properly. A control signal is sent by RFTL 130 through multicoupler 135 to each of the six radios contained in radio frequency source 105.

In sum, each of the six radios comprising radio frequency source 105 produces six different signals on six different frequencies. These six different signals are sent to six different Auto Tune Combiners that are cabled together to form Auto Tune Combiner 110. The Auto Tune Combiners combine the six different signals so as to allow maximum power transmission on antenna 125. The resulting signal is then filtered through band pass filter 115 and sent to antenna 125 through multicoupler unit 120. RFTL 130 samples the forward and reflected paths of the resulting signal from the forward and reflected connections on multicoupler unit 120. RFTL 130 then performs measurements on the forward and reflected paths to determine whether or not the radios are operating at the proper power as well as whether the antenna itself is operating properly. RFTL 130 then sends a feedback signal through multicoupler 135 to each of the six radios comprising radio frequency source 105.

The typical configuration described with reference to FIG. 1 may be implemented with an Ericsson RBS 884 system. This system typically comes in two different frequency bands, 1900 MHz and 850 MHz. Each of the components of the Ericsson RBS 884 system have certain limitations which constrain the number of channels that can be used in a given frequency spectrum.

The Auto Tune Combiners of this system are specified by Ericsson to require a 21 channel separation. In this case, channels are 30 kHz apart so that a 21 channel separation requires 630 kHz of spectrum. In the example of FIG. 1, this means that each of the six different radios contained in radio frequency source 105 must generate radio signals with frequencies that are at least 630 kHz apart. In a 5 MHz spectrum, this means that at most eight radios may transmit signals on antenna 125 at the same time.

This limitation is illustrated more clearly in FIG. 2A, which is a table depicting the 166 available channels in a 500 MHz spectrum divided into 21 different sets. To honor the 21 channel separation specified by Ericsson, the radio frequency source 105 which comprises multiple radios may only operate on one set of the channel sets depicted in FIG. 2A. As can be seen, the channel sets each contain channels that are separated by 630 kHz or 21 channels. In the typical configuration of FIG. 1, the multiple radios of radio frequency source 105 would be able to use, for example, channel set two which comprises channels 2, 23, 44, 65, 86, 107, 128 and 149. The multiple radios of radio frequency source 105 would not be able to use any of the other channels depicted in the table of FIG. 2A because each of these other channels is closer than 21 channels to the given channel set. Practically, this means that out of a possible 5 MHz spectrum comprising 166 30 kHz channels, only eight different channels can be used at the same time. This greatly limits the amount of capacity at a particular wireless communications site.

Through experimentation, the inventors have found that the Auto Tune Combiners of the Ericsson RBS 884 system, without any additional manipulation, can operate with an 11 channel separation. In this case, the signals generated by the radios of radio frequency source 105 must be 11 channels or 330 kHz apart. This greatly increases the number of frequencies that can be used at the same time by wireless transmission system 100. For example, each of the six different radios of radio frequency source 105 will be able to use six different channels that are 11 channels or 330 kHz apart simultaneously. FIG. 2B depicts channel sets that are 11 channels apart. In FIG. 2B, the entire 166 channels of a 5 MHz spectrum are divided into 11 different sets. Each of these 11 different sets contains channels that are 11 channels or 330 kHz apart. As can be seen, each of these sets contains at least six channels. Therefore, each of the six radios of radio frequency source 105 can operate simultaneously on the six different channels of a given set of FIG. 2B. Even with this 11 channel limitation, however, as can be seen in FIG. 2B, only 15 out of a possible 166 channels can be utilized at the same time. This greatly limits the amount of capacity that can be handled by a given wireless communications site.

A further limitation imposed by the Ericsson RBS 884 is found in RFTL 130. RFTL 130 requires four channel separation. This means that the radio frequency signals that are transmitted on antenna 125 and sampled by RFTL 130 must be four channels for 120 kHz apart. In the typical configuration of FIG. 1, however, the 11 channel separation of the Auto Tune Combiner 110 takes precedence over the four channel separation of RFTL 130. In other words, the 11 channel separation associated with Auto Tune Combiner 110 must be respected, which would also respect the four channel separation of RFTL 130. In sum, the typical configuration of FIG. 1 requires an 11 channel separation which greatly reduces the amount of a given spectrum that can be utilized.

Applicants have recognized the disadvantage of the limitations imposed by the typical configuration of FIG. 1 and have discovered a method and apparatus to overcome these limitations.

SUMMARY OF THE INVENTION

In accordance with the present invention, an apparatus and method for improving the spectrum utilization on a wireless communications system overcomes the 11 channel separation limitation of the prior art. Applicants have discovered that reconfiguring the system of FIG. 1 allows for the transmission in a sector of radio signals on adjacent channels.

In one aspect consistent with the general principles of the present invention, a method for improving the use of a transmission spectrum in a wireless communications system includes generating a first signal, processing the first signal with a first Auto Tune Combiner, transmitting the first signal on a first antenna associated with a sector, sampling the first signal with a first RFTL card, generating a second signal, processing a second signal with a second Auto Tune Combiner, transmitting the second signal on a second antenna associated with the sector, and sampling the second signal with a second RFTL card.

In a second aspect of the present invention, a method of communicating over a wireless network comprises generating a first set of signals, processing the first set of signals for transmission, transmitting the first set of signals on a first antenna associated with a sector, sampling the transmitted first set of signals with a first sampling device, generating a second set of signals, processing the second set of signals for transmission, transmitting the second set of signals on a second antenna associated with a sector, and sampling the transmitted second set of signals with a second sampling device.

In yet another aspect of the present invention, an apparatus for improving the use of a transmission spectrum in a wireless communications system comprises a first radio source for generating a first signal, a first Auto Tune Combiner for processing the first signal, and a first antenna associated with a sector for transmitting the first signal, a first radio frequency test loop for sampling the first signal, a second radio source for generating a second signal, a second Auto Tune Combiner for processing the second signal, a second antenna associated with the sector for transmitting the second signal, and a second radio frequency test loop for sampling the second signal.

In yet another aspect consistent with the general principles of the present invention, an apparatus for communicating over a wireless network comprises a first set of radio sources for generating a first set of signals, a first component for processing the first set of signals for transmission, a first antenna associated with a sector for transmitting the first set of signals, a first sampling device for sampling the transmitted first set of signals, a second set of radio sources for generating a second set of signals, a second component for processing the second set of signals for transmission, a second antenna associated with a sector for transmitting the second set of signals, and a second sampling device for sampling the transmitted second set of signals.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIGS. 2A, 2B, and 2C are diagrams depicting the various channel sets that can be used in a wireless communications system with various limitations;

Figure 1:
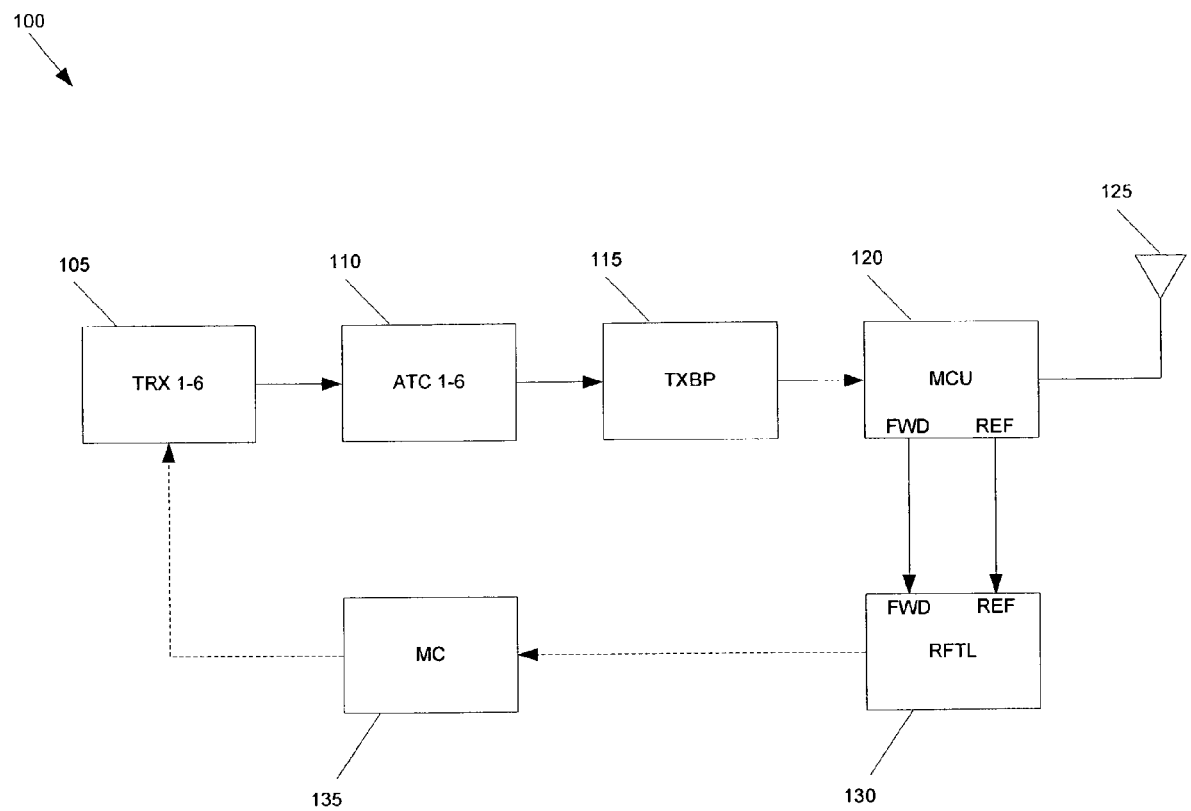
FIG. 1 is a block diagram of a prior art wireless communications system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Consistent with the general principles of the present invention, an apparatus for improving the use of a transmission spectrum in a wireless communications system includes: a first and second radio, a first and second Auto Tune Combiner, a first and second band pass filter, a first and second multicoupling unit, a first and second radio frequency test loop device (RFTL), a first and second antenna associated with a given sector, and a multicoupler. As herein embodied and illustrated in FIG. 4, an apparatus 400 for improving the use of a transmission spectrum in a wireless communications system includes: a first radio (TRX1) 405, a second radio (TRX2) 410, a first Auto Tune Combiner (ATC1) 415, a second Auto Tune Combiner (ATC2) 420, an Auto Tune Combiner Controller (ATCC) 425, a first band pass filter 430, a second band pass filter 435, a first multicoupler unit (MCU1) 440, a second multicoupler unit (MCU2) 445, a first radio frequency test loop device (RFTL1) 450, a second radio frequency test loop device (RFTL2) 455, a first antenna 310, a second antenna 315, and a multicoupler 470.

Figure 4:
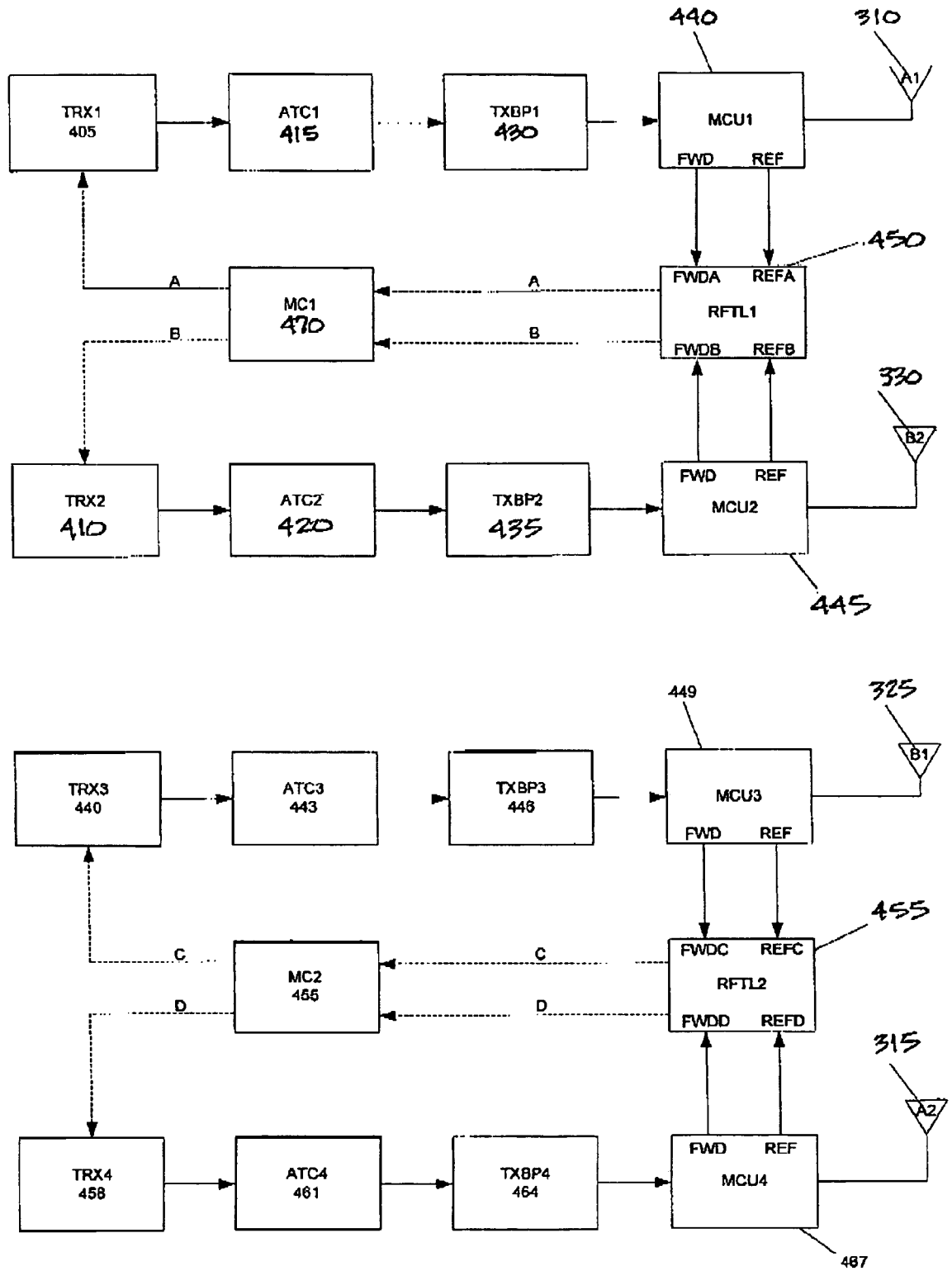
FIG. 4 is a block diagram of a wireless communications system consistent with the principles of the present invention.

In the embodiment depicted in FIG. 4, TRX1 405 is connected to ATC1 415 which is connected to first bandpass filter 430. First bandpass filter 430 is connected to MCU1 440. MCU1 440 interconnects first bandpass filter 430, first antenna 310 and RFTL1 450. RFTL1 450 is connected to multicoupler 470 which is connected to TRX1 405 and TRX2 410. TRX2 410 is connected to ATC2 420. ATC2 420 is connected to second bandpass filter 435 which is connected to MCU2 445. MCU2 445 interconnects second bandpass filter 435, second antenna 315, and RFTL2 455. RFTL2 445 is connected to multicoupler 470. ATCC425 is connected to ATC1 415 and ATC2 420.

The connections between the components depicted in FIG. 4 are typically implemented with cables, such as coaxial cables. In other aspects of the invention, the interconnection between these devices can be achieved in any convenient manner. As is known in the prior art, the interconnection between these devices can be implemented with cables or by wireless means. Likewise, the interconnections between the remaining components of FIG. 4 may also be via cable or via a wireless device.

Figure 3A:
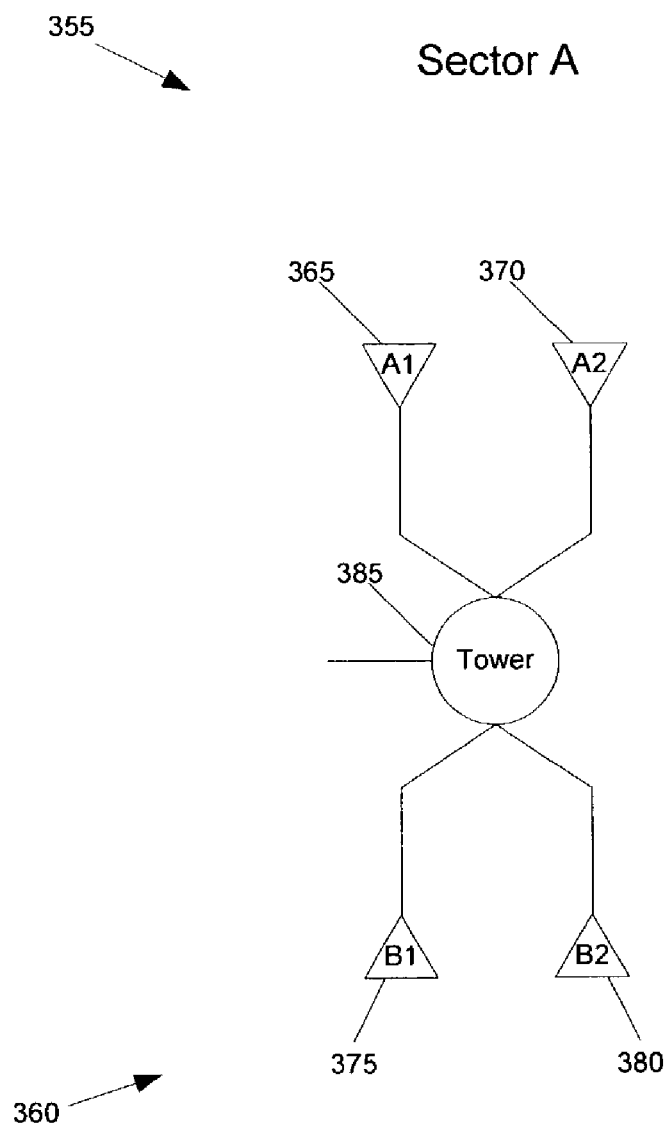
FIG. 3 is a top level view of a tower and six associated antennas divided into three different sectors at a wireless communications site consistent with the principles of the present invention.
Figure 3B:
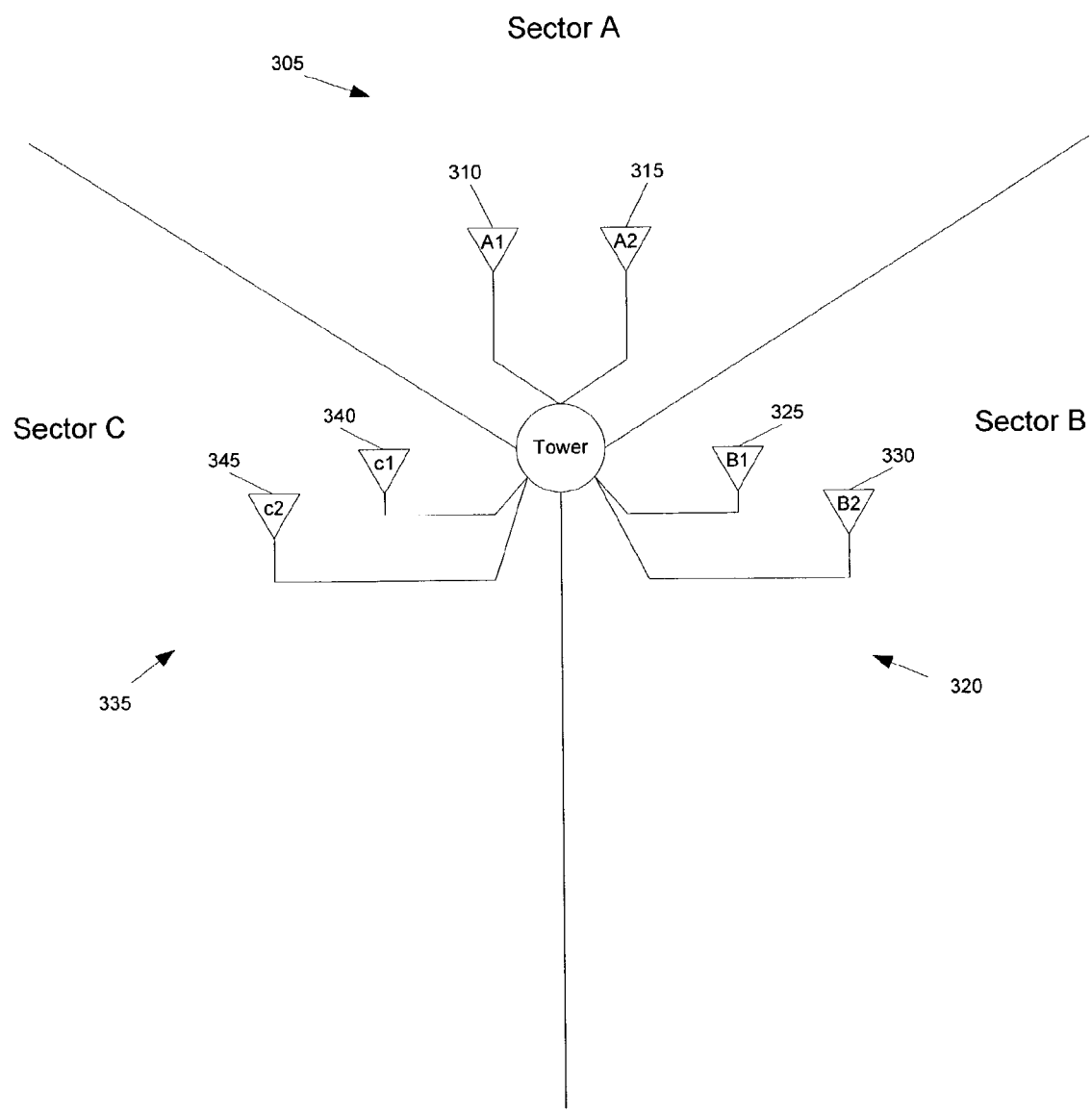

The configuration of FIG. 4 is better understood in conjunction with FIG. 3. Referring now to FIG. 3, an example of an antenna configuration associated with a wireless communications system site is depicted. In the example of FIG. 3, there are two antennas per sector. In this typical configuration, there are three different sectors, each occupying 120°. The central tower 350, on which the antennas are mounted, typically stands adjacent to the small building in which the equipment of FIG. 4 is housed. In this configuration, there are six different antennas mounted on tower 350. A first antenna (A1) 310 and a second antenna (A2) 315 occupy sector A 305. These two antennas, 310 and 315, transmit signals in the 120° occupied by sector A. In this manner, A1 310 and A2 315, are each directional antennas which transmit in sector A. Likewise, sector B 320 has two antennas, antenna B1 325 and antenna B2 330. Antenna B1 325 and antenna B2 330, like the antennas in sector A, are typically directional antennas. In this manner, antenna B1 325 and antenna B2 330 transmit in the 120° occupied by sector B 320. Finally, sector C 335 also contains two antennas, antenna C1 340 and antenna C2 345. Like the other antennas, antenna C1 340 and antenna C2 345 are directional antennas that transmit in the 120° occupied by sector C.

As can be seen, the antennas, 310 and 315, of FIG. 4, transmit on a particular sector, in this case sector A. In this manner, the wireless communications system depicted in the exemplary embodiment of FIG. 4 is associated with a single sector. The configuration of FIG. 4 may be repeated for other sectors. In this case, the configuration of FIG. 4 operates with two antennas in sector A. In other configurations, consistent with the principles of the present invention, multiple antennas may be employed in a given sector.

In the exemplary embodiment of the present invention depicted in FIG. 4, TRX1 405 and TRX2 410 are signal sources. Typically, TRX1 405 and TRX2 410 are 30 watts radio that each produce a signal at different frequencies or on different channels. In this embodiment, TRX1 405 produces a first signal on a first channel or frequency, and TRX2 410 produces a second signal on a second channel or frequency. Alternatively, these radios can be of any wattage and generate signals of any frequency. In alternate embodiments of the present invention, these radios can be any type of radio frequency or signal source. In a typical Ericsson RBS 884 system, these four radios are 30 Watt radios. Moreover, these radios, depending on the wireless communications system, may transmit in the 850 MHz bandwidth or the 1900 MHz bandwidth. FIG. 1 depicts a simplified version of the present invention with only two signal sources. Other embodiments of the present invention may contain any number of signal sources.

TRX1 405 and TRX2 410 are connected to ATC1 415 and ATC2 420 respectively. ATC1 415 and ATC2 420, like the prior art Auto Tune Combiners, serve to process the output of TRX1 405 and TRX2 410, respectively, for transmission on antenna 1 310 and antenna 2 315, respectively. In general, an Auto Tune Combiner, such as ATC1 415 or ATC2 420, combines all of the frequencies from the various radio frequency sources to get maximum power output to the antenna. These Auto Tune Combiners provide automatic combining of a set number of transmit channels. Further, these Auto Tune Combiners typically monitor the change in operating frequency and power of their corresponding transmitters and automatically tune each channel to the correct operating frequency. In one embodiment of the present invention, the Auto Tune Combiners, as well as the other components in the system depicted in FIG. 4, may be obtained from Ericsson (such as in the Ericsson RBS 884 system). In this case, ATC1 415 and ATC2 420 are controlled by ATCC 425. Typically, ATC1 415 and ATC2 420, as well as ATCC 425 are contained in a cabinet at the wireless communications site.

ATC1 415 is connected to a first band pass filter 430. Likewise, ATC2 420 is connected to a second band pass filter 435. Each of these two band pass filters, 430 and 435, filter the output of the two Auto Tune Combiners, 415 and 420 respectively. The output of each Auto Tune Combiner is typically a signal containing the different channels or frequencies produced by the different sets of radios attached to it. In this case, however, the output of ATC1 415 is simply the radio signal generated by TRX1 405. As mentioned, the signal generated by TRX1 405 is at a specific frequency or on a specific channel.

In this example, the band pass filters, 430 and 435, filter the output of the Auto Tune Combiners, 415 and 420, so that the signal transmitted on the antennas, 310 and 315, are within a designated radio frequency spectrum. Since a particular wireless communications site is allotted a particular spectrum on which to transmit, the band pass filters, 430 and 435, ensure that transmissions on the antennas, 310 and 315, occur within the allotted spectrum. In this manner, the band pass filters, as is known in the art, filter the output of their respective Auto Tune Combiners so that the signal transmitted on their respective antennas does not fall outside the bandwidth allocated to the wireless provider. For example, a wireless provider, in an e-band system, may be provided 5 MHz of bandwidth in which to transmit. The band pass filters, in this example, would then filter the output of their respective Auto Tune Combiners so as to ensure that the transmitted signal falls within the allocated 5 MHz bandwidth. In this manner, the four band pass filters would each function to filter out any signals that fall outside of the specified 5 MHz bandwidth. The operation of band pass filters is known to those skilled in the art, and band pass filters are easily obtainable from any number of manufacturers, including Ericsson.

The band pass filters 430 and 435 are connected to MCU1 440 and MCU2 445 respectively. The output of the first band pass filter 430 is received by MCU1 440. Likewise, the output of the second band pass filter 435 is received by MCU2 445. As noted in the description of FIG. 1, MCU1 440 and MCU2 445 are each connected to an antenna and an RFTL device. In this case, MCU1 440 is interconnected with a first antenna 310 and a first RFTL device 450. Likewise MCU2 445 is interconnected with a second antenna 315 and a second RFTL device 455. MCU1 440 and MCU2 445 serve as connection points for the first antenna 310 and the second antenna 315, respectively. In addition, MCU1 440 and MCU2 445, like the prior art multicoupler units, allow RFTL1 450 and RFTL2 455 to sample the signals that are transmitted on the first antenna 310 and the second antenna 315. As depicted in FIG. 4, MCU1 440 and MCU2 445 each have a sampling point for the forward path and the reflected path signals.

The antennas of the embodiment in FIG. 4, Antenna A1 310, Antenna A2 315, are typically unidirectional antennas, but may be antennas of any type. In the embodiments of FIG. 3 and FIG. 4, the six antennas depicted are directional antennas which each transmit in their respective sectors. For example, Antenna A1 310 and Antenna A2 315 transmit in Sector A 305. In this case, these two antennas are unidirectional antennas that transmit in a 120 degree area. Likewise, Antennas B1 325 and B2 330 transmit in Sector B 320 and, in this case, are unidirectional antennas that transmit in a 120 degree area. While unidirectional antennas are depicted in this embodiment of the present invention, other embodiments of the present invention may employ any type of antenna. For example, a wireless communications system may be divided into any number of sectors, each with associated antennas. In the case of a multi-sectored communications system, the antennas in a particular sector are typically configured to transmit only in that sector. Alternatively, an omni-directional antenna may be used which transmits over the entire 360 degree area. The operation of these antennas is known to those skilled in the art, and these antennas can be obtained from any number of wireless equipment providers, such as Ericsson.

RFTL1 450 and RFTL2 455 sample both the forward and reflected signals from MCU1 440 and MCU2 455, respectively. In this case, RFTL1 450 samples the forward path for the signal that is actually transmitted on the first antenna 310 through the forward port of MCU1 440. In a similar fashion, RFTL1 450 samples the reflected path from the reflected port of MCU1 440. As noted in reference to FIG. 1, RFTL1 450 and RFTL2 455 each serve to verify that the radios TRX1 405 and TRX2 410 are operating at the proper power. Likewise, RFTL1 450 and RFTL2 455 also verify that the first antenna 310 and the second antenna 315 are operating properly. RFTL1 450 and RFTL2 455 each send feedback signals through multicoupler 470 to TRX1 405 and TRX2 410. In this manner, RFTL1 450 controls TRX1 405 and RFTL2 455 controls TRX2 410. In one embodiment of the present invention, RFTL1 450 and RFTL2 455 perform voltage standing wave ratio (VSWR) measurements to ensure that the wireless communications system is operating properly.

In operation, TRX1 405 generates a first radio signal at a first frequency or on a first channel. This radio signal then passes to ATC1 415, where it is processed for transmission. The resulting processed signal is then filtered by band pass filter 430 and transmitted on first antenna 310 after passing through MCU1 440. The forward path and reflected path signals are sampled by RFTL1 450 from test ports on MCU1. RFTL1 450 performs various tests on the forward path and reflected path signals to generate feedback for TRX1 405. For example, RFTL1 450 may find that TRX1 405 is not transmitting at a proper power level. In this case, RFTL1 450 may send a signal via multicoupler 470 to TRX1 405 to adjust its power.

In a similar manner, TRX2 410 generates a radio signal at a particular frequency or on a particular channel. The output of TRX2 410 passes to ATC2 420 for processing. The output of ATC2 420 is then filtered through a second band pass filter 435 and transmitted on a second antenna 315. The signal first passes through MCU2 445 before transmission on second antenna 315. RFTL2 455 samples the forward path and reflected path signals from test ports contained on MCU2 445. In a similar manner to RFTL1 450, RFTL2 455 performs various tests on the forward and reflected signals to determine, for example, if TRX2 410 is operating at the proper power level. RFTL2 455 sends feedback signals via multicoupler 470 to control TRX2 410.

First antenna 310 and second antenna 315 are each associated with a sector. In this manner, first antenna 310 and second antenna 315 transmit on a single sector of a wireless communications system.

In operation, the wireless communications system of FIG. 4 allows for the transmission on adjacent channels of signals in the same sector. As noted with reference to FIG. 1, an eleven channel separation must be maintained between sequentially connected Auto Tune Combiners. In the example of FIG. 4, however, ATC1 415 and ATC2 420 are not sequentially connected. Therefore, there need not be an eleven channel separation between signals processed by ATC1 415 and ATC2 420. By splitting ATC1 415 and ATC2 420 into two different transmit paths, the eleven channel separation requirement is overcome.

In the same manner, signals that are sampled by an RFTL device must be separated by four channels. This four channel separation limitation is inherent in the RFTL device of the Ericsson RBS 884 system. In the embodiment of FIG. 4, however, the transmit path is split between RFTL1 450 and RFTL2 455. In this manner, the four channel separation requirement of a single RFTL device is overcome.

In sum, by placing an Auto Tune Combiner and RFTL device on separate paths associated with separate antennas of the same sector, the eleven channel separation requirement inherent in sequentially connected Auto Tune Combiners can be overcome. Likewise, the four channel separation limitation associated with a particular RFTL device can also be overcome. Therefore, in the configuration of FIG. 4, TRX1 405 can transmit on one channel and TRX2 410 can transmit on an adjacent channel. By being able to utilize adjacent channels in the same sector, the limited spectrum that is allocated to a particular wireless carrier can be more thoroughly utilized, thus alleviating the need to build additional transmission sites.

The wireless communications system 400 of FIG. 4 thus allows tighter use of the frequencies within a given spectrum. For example, an e-band license, which is typically 5 MHz, contains 166 channels. In this case, each channel of the 166 different channels in any given 5 MHz bandwidth is 30 kHz apart. As shown in FIG. 2B, an 11 channel separation mandated by sequentially connected Auto Tune Combiners will only allow the use of 8 channels in a sector at the same time. Likewise, with reference to FIG. 2C, a four channel separation limitation required by a single RFTL device mandates that the 166 channels be divided into four sets of about 41 channels each. In this case, for the four channel separation limitation of the RFTL device to be respected, only 41 channels may be used in a single sector. However, with the configuration depicted in FIG. 4, adjacent channels can be used in the same sector. In this manner, better channel use in a limited allotted spectrum can be maintained.

While the example of FIG. 4 depicts only two radios and two antennas associated with a single sector, the principles of the present invention can be implemented with any number of radios associated with any number of antennas divided into any number of sectors. For example, a four sector system with multiple antennas in each sector may be implemented to allow the use of every single channel in a 5 MHz spectrum.

Figure 5:
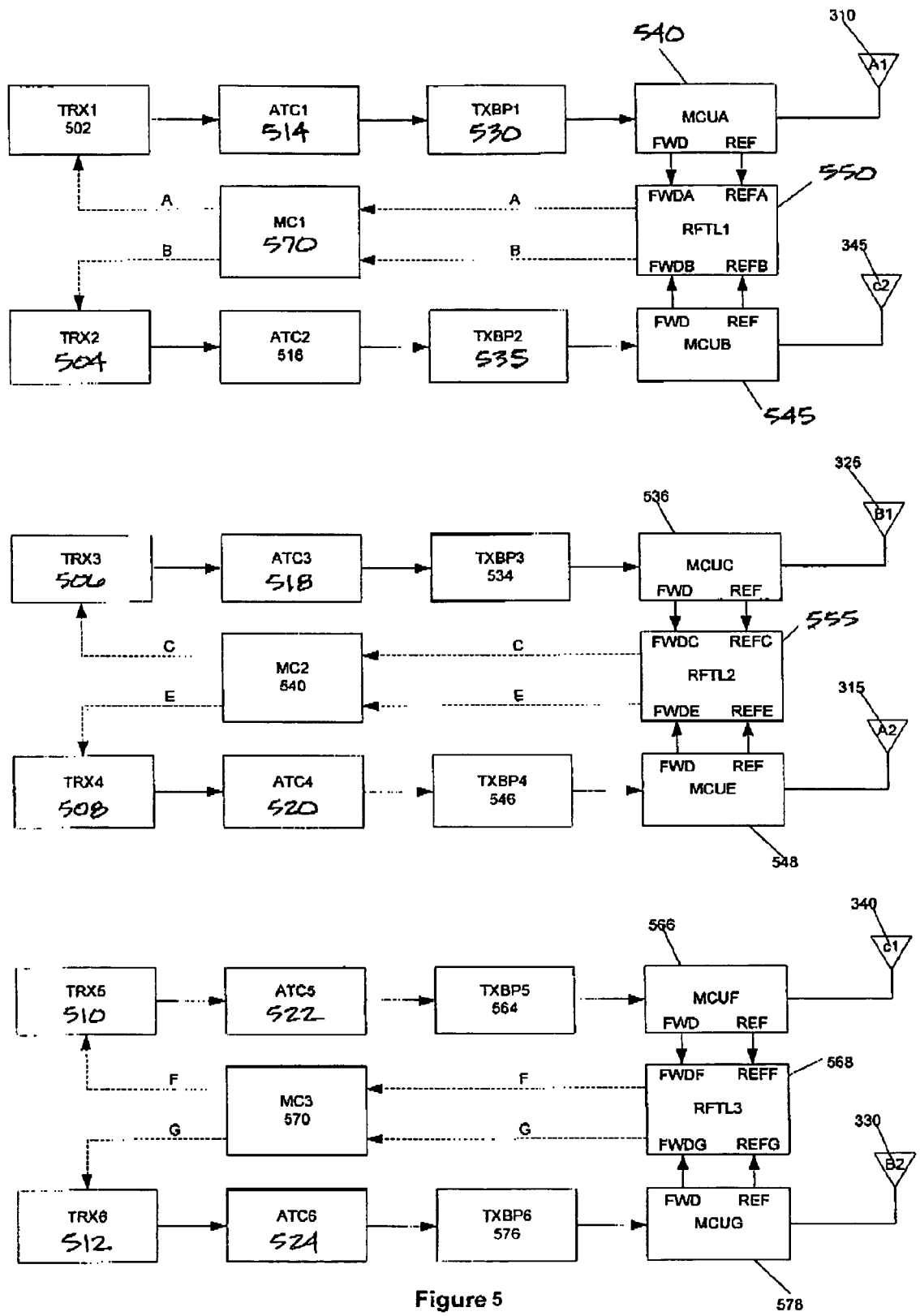
FIG. 5 is a wireless communications system with six radios consistent with the principles of the present invention.

FIG. 5 depicts a wireless communications system consistent with the principles of the present invention. The exemplary embodiment of FIG. 5 extends the embodiment depicted in FIG. 4 to multiple radios per antenna. In the example of FIG. 5, 6 different radios transmit on two different antennas associated with a single sector. As herein embodied and illustrated in FIG. 5, an apparatus for improving the use of a transmission spectrum in a wireless communications system includes a first radio 502, a second radio 504, a third radio 506, a fourth radio 508, a fifth radio 510, a sixth radio 512, a first Auto Tune Combiner (ATC1) 514, a second Auto Tune Combiner (ATC2) 516, a third Auto Tune Combiner (ATC3) 518, a fourth Auto Tune Combiner (ATC4) 520, a fifth Auto Tune Combiner (ATC5) 522, a sixth Auto Tune Combiner (ATC6) 524, an Auto Tune Combiner Controller (ATCC) 526, a first band pass filter 530, a second band pass filter 535, a first multicoupler unit (MCUA) 540, a second multicoupler unit (MCUB) 545, a first radio frequency test loop (RFTLA) 550, a second radio frequency test loop (RFTLB) 555, a first antenna (A1) 310, a second antenna (A2) 315, and a multicoupler 570.

In FIG. 5, first radio 502, second radio 504, and third radio 506 are connected to ATC1 514, ATC 2, 516, and ATC3 518, respectively. ATC1 514, ATC 2, 516, and ATC3 518 are sequentially connected to each other and are also connected to ATCC 526. The output of ATC1 514, ATC 2, 516, and ATC3 518 is then connected to first bandpass filter 530. First bandpass filter 530 is connected to MCUA 540. MCUA 540 interconnects first antenna 310, first bandpass filter 530, and RFTLA 550. RFTLA 550 is connected to multicoupler 570 which is then connected to the first through the sixth radios 502–512.

The fourth through the sixth radios, 508–512, are connected in a similar manner to form a second transmit path. Fourth radio 508, fifth radio 510, and sixth radio 512 are connected to ATC4 520, ATC5 522, and ATC6 524, respectively to ATC4 520, ATC5 522, and ATC6 524 are sequentially connected to each other and are also connected to ATCC 526. The output of to ATC4 520, ATC5 522, and ATC6 524 is then connected to second bandpass filter 535. Second bandpass filter 535 is connected to MCUB 545. MCUB 545 interconnects second antenna 315, second bandpass filter 535, and RFTLB 555. RFTLB is connected to multicoupler 570 which is then connected to the first through the sixth radios, 502–512.

The components of the exemplary embodiment depicted in FIG. 5 possess the same qualities and characteristics of the components described in reference to FIG. 4. For example, first radio 502 of FIG. 5 and first radio 405 of FIG. 4 may be 30 Watt radios. Likewise, the Auto Tune Combiners of FIGS. 4 and 5 operate in a similar manner and possess similar characteristics. In addition, the band pass filters, multi-coupler units, radio frequency test loop devices, multi-couplers, and antennas depicted in FIG. 5 possess the same qualities and characteristics of the like devices depicted in FIG. 4.

Each of the 6 radios, 502–512, produces a signal at different frequencies or on different channels. For example, the first radio 502 may produce a signal at a first frequency or on a first channel while the second radio 504 produces a signal at a second frequency or on a second channel. Typically, each of the 6 radios, 502–512, is a 30 watt radio. While the example of the present invention depicted in FIG. 5 comprises 6 different radios, each of 30 watts, any number of radios with any type of power output may be used consistent with the principles of the present invention.

In the example of FIG. 5, 6 Auto Tune Combiners, 514–524, and one Auto Tune Combiner Controller, 526, is depicted. In this configuration, ATC1 514, ATC2 516, and ATC3 518 are all sequentially connected. Likewise, ATC4 520, ATC5 522, and ATC6 524 are also sequentially connected. As illustrated, the output of the first radio 502 is fed into ATC1 514. Likewise, the output of the second thru sixth radios, 504–512, is fed into the second through the sixth Auto Tune Combiners, 516–524, respectively. In this manner, each radio, 502–512, has a separate Auto Tune Combiner, 514–524, associated with it.

The output of the first 3 Auto Tune Combiners, ATC1 514, ATC2 516, and ATC3 518, is input into the first band pass filter 530. Likewise, the output of the second set of three Auto Tune Combiners, ATC4 520, ATC5, 522 and ATC6 524, is input into the second band pass filter 535. As previously described, band pass filters 530 and 535 filter the output of the Auto Tune Combiners to which they are connected. In this manner, band pass filters 530 and 535 insure that the signal transmitted on the first and second antennas 310 and 315 is within an allotted spectrum.

After filtering, the signals pass to MCUA 540 and MCUB 545 respectively. Antenna A1 310 is connected to MCUA 540, and antenna A2 315 is connected to MCUB 545. In this manner, the output of the band pass filters, 530 and 535, are fed into multicoupler units 540 and 545 for transmission on antennas 310 and 315 respectively.

RFTLA 550 and RFTLB 555 sample both the forward and reflected signals from the forward and reflective ports of MCUA 540 and MCUB 545, respectively. After sampling the forward and reflected signals, RFTLA 550 and RFTLB 555 send control signals through multicoupler 570 to the six radios 502–512. In the configuration depicted in the example of FIG. 5, RFTLA 550 monitors and controls the first three radios, 502–506, while RFTLB 555 monitors and controls the fourth through sixth radios, 508–512.

In operation, the six radios each generate a signal on six different channels. The first radio 502 generates a first signal on a first channel (or at a first frequency) that is sent to ATC1 514. Likewise, the second through sixth radios, 504–512 each generate signals on a second through a sixth different channel (or a second through a sixth different frequency) that is sent to ATC2 516 through ATC6 524, respectively. In this manner, each of the first through sixth radios, 502–512, has associated with it an Auto Tune Combiner, 514–524.

In the configuration depicted in FIG. 5, ATC1 514, ATC2 516, and ATC3 518 are all sequentially connected. In this case, ATC1 514, ATC2 516, and ATC3 518 take the signals from the first through the third radios, 502–506, and process them together to form one output signal that is sent to band pass filter 530. In this manner, the 3 Auto Tune Combiners, 514–518, process the 3 radio signals generated on 3 different channels by the first through third radios, 502–506, to obtain an output signal with an optimal power for transmission on first antenna 310. Likewise, ATC4 520, ATC5 522, and ATC6 524 process the 3 different outputs from the fourth through sixth radios, 508–512. The output of ATC4 520, ATC5 522, and ATC6 524 is sent to the second band pass filter 535. The second set of Auto Tune Combiners, 520–524, process the 3 different signals produced by the fourth through sixth radios, 508–512, into a single output signal. In this manner, each set of Auto Tune Combiners receives as input signals from different radios transmitting at different frequencies and combines those different signals into a single signal with an optimal power for transmission on an antenna.

The output of the first group of Auto Tune Combiners, 514–518, is then filtered by the first band pass filter 530 and transmitted on the first antenna 310. Likewise, the output of the second set of Auto Tune Combiners, 520–524, is filtered by second band pass filter 535 and then transmitted on the second antenna 315.

RFTLA 550 samples both the forward path and reflected path signals from MCUA 540. In the same manner, RFTLB 555 samples the forward path and reflected path signals from MCUB 545. As previously described, RFTLA 550 and RFTLB 555 perform various tests on the forward and reflected signals and send feedback through multicoupler 570 to their respective radios. For example, if the first radio 502 is not producing a signal at the proper power level, RFTLA, after sampling the forward and reflected signals from MCUA 540 and testing those signals, sends a feedback signal via multicoupler 570 to the first radio 502. This feedback signal in FIG. 5 is denoted by the dashed line.

While the example of FIG. 5 depicts only 6 radios, 6 Auto Tune Combiners, and two antennas operating on a single sector, multiple radios, multiple Auto Tune Combiners, and multiple antennas operating on multiple sectors, may be implemented with the principles of the present invention. Likewise, multiple RFTL devices may be used consistent with the principles of the present invention.

The wireless communications system depicted in the example of FIG. 5 overcomes the 11 channel separation limitation inherent in the Auto Tune Combiners as well as the four channel separation limitation inherent in the RFTL cards of the Ericcson RBS 884 system by splitting the 6 radios into two different transmit paths of 3 radios each. In this configuration, the first through the third radios, 502–506, transmit on a first antenna 310 associated with a sector. Likewise, the fourth through the sixth radios, 508–512, transmit on a second antenna 315 associated with the same sector.

The wireless communications system depicted in FIG. 5 may be implemented in conjunction with the antenna configuration of FIG. 3. With reference to FIG. 3, the wireless communications system 500 of FIG. 5 and its associated antennas 310 and 315 can correspond, for example, to any two antennas associated with a single sector in FIG. 3. For example, the wireless communications system 500 of FIG. 5 may be implemented on sector B 320 or sector C 335 of FIG. 3.

The split transmit paths associated with the first through the third radios 502–506 and the fourth through the sixth radios 508–512 overcome the 11 channel separation limitation as well as the four channel separation limitation for a given sector, in this case sector A, associated with antenna A1 310 and antenna A2 315. While the signals transmitted on antenna A1 310 must respect the 11 channel limitation inherent in the Auto Tune Combiners, the signals transmitted on antenna A2 315 can be adjacent to those transmitted on antenna A1 310.

In operation, the first 3 radios, 502–506, each produce 3 different signals carried on 3 different channels. Since these 3 different signals are fed into sequentially connected Auto Tune Combiners, 514–518, the signals generated by the first through the third radios, 502–506, must respect the 11 channel separation limitation inherent in the Auto Tune Combiners. Therefore, the first radio 502, the second radio 504, and the third radio 506, must each generate a radio signal output on channels that are separated by 330 kHz (or 11 channels). The output signals of these first 3 radios, 502–506, each separated by 11 channels, are then processed and transmitted in sector A on antenna A1 310.

In a similar manner, the fourth through the sixth radios, 508–512, because they are connected to sequentially connected Auto Tune Combiners, 520–524, must also respect the 11 channel separation limitation inherent in the Auto Tune Combiners. Therefore, the fourth through the sixth radios, 508–512, must each output a radio signal that is separated by 11 channels or 330 kHz.

However, the signals of the first through the third radios, 502–506, and the signals from the fourth through the sixth radios, 508–512, may be carried on adjacent channels. Since the first through the third Auto Tune Combiners, 514–518, are not sequentially connected to the fourth through the sixth Auto Tune Combiners, 520–524, the 11 channel separation limitation, while applying to the individual sets of Auto Tune Combiners, does not apply between the two sets of Auto Tune Combiners. It should also be noted that the 11 channel separation limitation inherent in the Auto Tune Combiners supercedes the four channel limitation inherent in the RFTL card. Since the output of radios that are separated by 11 channels will also necessarily be separated by four channels, it is the 11 channel limitation that takes precedence in this configuration.

With reference to FIG. 2B, the first through the third radios, 502–506, may operate on any one of the 11 sets of channels depicted while the fourth through the sixth radios, 508–512, may operate on any of the remaining sets or any of the remaining channels in the set used by the first through the third radios, 502–506. In addition to overcoming the 11 channel separation limitation of the Auto Tune Combiners, the wireless communications system of FIG. 5 also overcomes the four channel separation limitation inherent in the RFTL card of the Ericcson RBS 884 system. For a given sector, the two different antennas, 310 and 315, each have associated with them a separate RFTL card. In this case, since antenna A1 310 and antenna A2 315 each have a separate set of Auto Tune Combiners and a separate RFTL card, the first through third radios, 502–506, may transmit on channels adjacent to those on which the fourth through sixth radios, 508–512, transmit.

For example, the first through third radios, 502–506, may output a signal from any one of the channel sets depicted in FIG. 2B. The first through third radios, 502–506, may choose to transmit on channel set number 5 of FIG. 2B. Therefore, first radio 502 may transmit on channel 104, the second radio 504 may transmit on channel 16, and third radio 506 may transmit on channel 27. In this manner, the first through the third radios, 502–506, respect the 11 channel separation limitation inherent in the sequentially connected Auto Tune Combiners. These 3 channels, channel 5, channel 16, and channel 27, are then transmitted on antenna A1 310. Since the second antenna A2, 315, in the same sector is connected to a different set of Auto Tune Combiners, 520–524, and a separate RFTL card, 555, the fourth through the sixth radios, 508–512, may output a signal on any other channels besides those taken by the first through the third radios, 502–506. For example, the fourth through the sixth radios, 508–512, may select channels in channel set 6 of FIG. 2B. In this example, the fourth radio, 508, may output a signal on channel 6, the fifth radio, 510, may output a signal on channel 17, and the sixth radio, 512, may output a signal on channel 28. These 3 signals, channel 6, channel 17, and channel 28, are then transmitted on antenna A2 315. In this manner, the two antennas, antenna A1 310 and antenna A2 315, associated with the same sector broadcast signals that are on adjacent channels. In this example, the first through third radios, 502–506, broadcast on channels 5, 16 and 27, respectively, while the fourth through the sixth radios, 508–512, broadcast on channels 6, 17 and 28, respectively.

The wireless communications system 500 of FIG. 5, therefore, allows a tighter use of channels in a given spectrum. In a typical e-band license that comprises a 5 MHz spectrum, the 166 30 kHz channels that can be transmitted in a 5 MHz spectrum may be more fully utilized. While the example of FIG. 2B is limited to a 5 MHz spectrum, the same principles apply to a spectrum of any size, for example, a 15 MHz cellular spectrum.

The principles of the present invention can be extended to a wireless communications system divided into any number of sectors. For example, the configuration of components depicted in FIG. 5 can be duplicated for each sector of a multi-sector communications system. In this manner, every single channel of an allotted spectrum can be used in a multi-sector configuration of sufficient size. For example, in a five sector system with two transmit antennas per sector ten of the eleven channel sets depicted in FIG. 2B can be utilized thereby greatly increasing the number of channels available for transmission.

Figure 6:
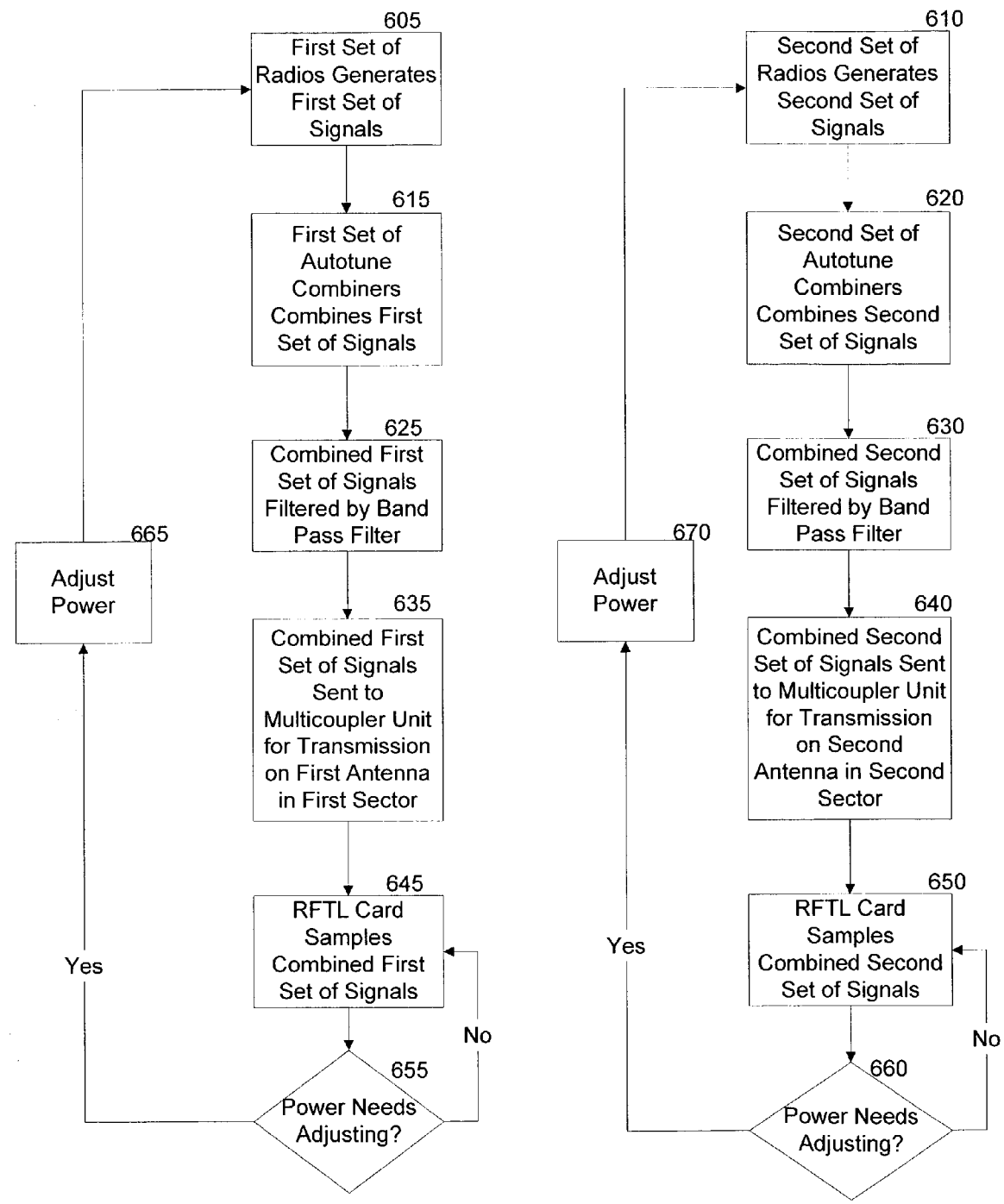
FIG. 6 is a flow chart depicting the operation of the wireless communications system of FIGS. 4 and 5 consistent with the principles of the present invention.

FIG. 6 is a flowchart depicting the operation of the wireless communications systems depicted in FIG. 4 and FIG. 5. The flow of the two different flowcharts depicted in FIG. 6 both proceed in parallel. Each of the two flowcharts of FIG. 6 correspond with each of the two different transmit loops of FIG. 4 or FIG. 5.

In the example of FIG. 6, the process begins in steps 605 and 610 in which a first set of radios generates a first set of signals (605) and a second set of radios generates a second set of signals (610). As previously described, the first set of signals depicted by step 605 may correspond to a set of signals depicted in FIG. 2B. Likewise, the second set of signals generated in step 610 may correspond to a second set of signals depicted in FIG. 2B.

After the first set of radios generates the first set of signals in step 605, the first set of Auto Tune Combiners combines the first set of signals in step 615. The flow proceeds to step 625 in which the combined first set of signals is filtered by a band pass filter. Thereafter, in step 635, the combined first set of signals is sent to a multicoupler unit for transmission on a first antenna in a first sector. In step 645, a first RFTL card samples the combined first set of signals and performs various test functions. One of these test functions in depicted in step 655 in which the RFTL card determines whether the power of a radio needs adjusting. If the power of a radio does not need adjusting, the flow proceeds to step 645 and the RFTL card continues to sample the first set of signals. If the power needs adjusting, the RFTL card sends a signal to adjust the power as depicted in step 665. The signal indicating that power needs to be adjusted is sent to the specified radio and flow proceeds to step 605 in which the first set of radios generates a first set of signals. After the power is adjusted in step 665, the radio that generates one of the signals in step 605 generates its signal at the adjusted power.

The same flow proceeds in parallel for the second set of radios. As mentioned, in step 610, a second set of radios generates a second set of signals. The flow then proceeds to step 620 in which a second set of Auto Tune Combiners combines the second set of signals. In step 630, the combined second set of signals is filtered by a band pass filter. In step 640, the combined second set of signals is sent to a multicoupler unit for transmission on a second antenna in a first sector. In step 650, a second RFTL card samples the combined second set of signals. This second RFTL card, as previously described, performs various tests on this sampled second set of signals. One of the tests, depicted in step 660, may be to determine whether one of the radios needs its power adjusted. In step 660, the RFTL card determines whether or not a radio needs its power adjusted. If the radio does not need it power adjusted, then flow proceeds to step 650 in which the second RFTL card continues to monitor the combined second set of signals. If the power of one of the radios does need adjusting, then flow proceeds to step 670 in which the power of the radio is adjusted. In this manner, the RFTL card sends a feedback signal to one of the radios. After the radio's power is adjusted in step 670, flow proceeds to step 610 in which the second set of radios continues to generate a second set of signals.

DESCRIPTION OF THE EMBODIMENTS

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for improving the use of a transmission spectrum in a wireless communications system, the method comprising:
    generating a first signal;
    processing the first signal with the first Auto Tune Combiner;
    transmitting the processed first signal on a first antenna associated with a sector;
    sampling the processed first signal with a first radio frequency test device having a channel separation requirement;
    generating a first feedback signal;
    generating a second signal;
    processing the second signal with a second Auto Tune Combiner;
    transmitting the processed second signal on a second antenna associated with the sector;
    sampling the processed second signal with a second radio frequency test device having a channel separation requirement;
    generating a second feedback signal; and
    coupling the first and second feedback signals,
    the first and second signals being generated on adjacent channels.

2. The method of claim 1 further comprising:
    generating a third signal;
    processing the third signal with a third Auto Tune Combiner;
    transmitting the processed third signal on a third antenna associated with a second sector;
    sampling the processed third signal with the first radio frequency test device;
    generating a fourth signal;
    processing the fourth signal with a fourth Auto Tune Combiner;
    transmitting the processed fourth signal on a fourth antenna associated with the second sector; and
    sampling the processed fourth signal with the second radio frequency test device,
    the third and fourth signals being generated on adjacent channels,
    the sharing of the first radio frequency test device between the first signal and the third signal overcoming the channel separation requirement of the first radio test device and the second radio test device to enable transmission on adjacent channels in the first sector and the second sector.

3. The method of claim 1 further comprising:
    filtering the processed first signal before transmission; and
    filtering the processed second signal before transmission.

4. The method of claim 1 further comprising:
    adjusting a first signal source power based on the sampled processed first signal; and
    adjusting a second signal source power based on the sampled processed second signal.

5. An apparatus for improving the use of a transmission spectrum in a wireless communications system, the apparatus comprising:
    a first radio source for generating a first signal;
    a first Auto Tune Combiner for processing the first signal;
    a first antenna associated with a sector for transmitting the first signal;
    a first radio frequency test device having a channel separation requirement for sampling the processed first signal and producing a first feedback signal;
    a second radio source for generating a second signal;
    a second Auto Tune Combiner for processing the second signal;
    a second antenna associated with the sector for transmitting the second signal;
    a second radio frequency test device having a channel separation requirement for sampling the processed second signal and producing a second feedback signal; and
    a multicoupler for directing the first and second feedback signals to the first and second radio sources,
    the first and second signals being generated and transmitted on adjacent channels.

6. The apparatus of claim 5 further comprising:
    a third radio source for generating a third signal;
    a third Auto Tune Combiner for processing the third signal;
    a third antenna associated with a second sector for transmitting the third signal, the third signal being processed by the first radio frequency test device;
    a fourth radio source for generating a fourth signal;
    a fourth Auto Tune Combiner for processing the fourth signal; and a fourth antenna associated with the second sector for transmitting the fourth signal, the fourth signal being processed by the second radio frequency test device;

the third and fourth signals being generated and transmitted on adjacent channels, the sharing of the first radio frequency test device between the first signal and the third signal overcoming the channel separation requirement of the first radio test device and the second radio test device to enable transmission on adjacent channels in the first sector and the second sector.

7. The apparatus of claim 5 further comprising:

a first bandpass filter for filtering the processed first signal before transmission; and a second bandpass filter for the processed second signal before transmission.

8. An apparatus for communicating over a wireless network, the apparatus comprising:

a first set of radio sources for generating a first set of signals;

a first set of Auto Tune Combiners, the Auto Tune Combiners in the first set being interconnected and having a channel separation requirement for processing the first set of signals for transmission;

a first antenna associated with a sector for transmitting the processed first set of signals;

a first sampling device for sampling the transmitted first set of signals and generating a first set of feedback signals;

a second set of radio sources for generating a second set of signals;

a second set of Auto Tune Combiners, the Auto Tune Combiners in the first set being interconnected and having a channel separation requirement for processing the second set of signals for transmission;

a second antenna associated with the sector for transmitting the processed second set of signals;

a second sampling device for sampling the transmitted second set of signals and generating a second set of feedback signals; and a multicoupler for directing the first set of feedback signals and the second set of feedback signals to the first set of radio sources and the second set of radio sources, each one of the first set of signals having a corresponding one of the second set of signals on an adjacent channel which is transmitted in the same sector, the separating of the signal paths of the first set of signals and the second set of signals overcoming the channel separation requirement of the Auto Tune Combiners to enable transmission on adjacent channels in the same sector.

* * * * *